United States Patent [19]

Critton et al.

[11] Patent Number: 4,872,369
[45] Date of Patent: Oct. 10, 1989

[54] TORSIONAL VIBRATION DAMPER HAVING A ROLL SPUN HOUSING AND OTHER IMPROVEMENTS

[75] Inventors: Thomas J. Critton, East Amherst, N.Y.; Donald S. Johnson, Fort Erie, Canada; Walter P. Pukalo, Blasdell, N.Y.; Ralph Yorio, Easton, Pa.

[73] Assignee: Vibratech, Inc., Buffalo, N.Y.

[21] Appl. No.: 81,003

[22] Filed: Aug. 3, 1987

[51] Int. Cl.⁴ ............................................. F16F 15/10
[52] U.S. Cl. ....................................... 74/574; 188/379
[58] Field of Search ................... 74/574, 573 F, 573; 188/378, 379, 268, 380; 464/180, 24

[56] References Cited

U.S. PATENT DOCUMENTS

| | | | |
|---|---|---|---|
| 2,987,938 | 6/1961 | Burch | 74/574 |
| 3,121,347 | 2/1964 | Rumsey | 74/574 |
| 3,234,817 | 2/1966 | Williamson | 74/574 |
| 3,262,334 | 7/1966 | Edwards | 74/574 |
| 3,398,602 | 8/1968 | Croset | 74/574 |
| 3,410,369 | 11/1968 | Ishizuka | 188/379 |
| 3,443,454 | 5/1969 | Hall | 74/574 |
| 3,512,612 | 5/1970 | Bragg | |
| 3,716,901 | 2/1983 | Bragg et al. | 74/574 X |
| 3,771,380 | 11/1973 | Bahr | 74/574 |
| 4,172,510 | 10/1979 | Forkel | 188/379 |
| 4,386,728 | 6/1983 | Torok | 228/111 |
| 4,422,347 | 12/1983 | Conseur | 74/574 |
| 4,660,436 | 4/1987 | Daroust et al. | 74/574 |

FOREIGN PATENT DOCUMENTS

| | | | |
|---|---|---|---|
| 1134648 | 11/1982 | Canada | 74/574 |
| 1939491 | 2/1970 | Fed. Rep. of Germany | 74/574 |
| 2145610 | 3/1973 | Fed. Rep. of Germany | 188/378 |
| 2745737 | 4/1979 | Fed. Rep. of Germany | 188/379 |
| 1240947 | 8/1960 | France | 188/378 |
| 673773 | 6/1952 | United Kingdom | 74/574 |
| 736808 | 9/1955 | United Kingdom | 74/574 |

OTHER PUBLICATIONS

"Spinning", Storch et al, Machine Design, Feb. 17, 1972, pp. 140–141.

Primary Examiner—Rodney M. Lindsey

[57] ABSTRACT

A viscous torsional vibration damper of the kind operating on the shear film principle has a roll spun annular channel shaped housing providing an annular working chamber within which is mounted an annular complementary inertia mass ring and a viscous damping fluid substantially fills shear film spaces between the working surfaces of the inertia ring and confronting working surfaces of the housing within the chamber. Working surface area of the housing within the working chamber has a spinning roll burnished finish. A roll formed rabbet provides a shoulder seat on one wall of the housing with an edge portion of a closure sealed thereto. Laser welding permanently secures the closure to the housing.

12 Claims, 3 Drawing Sheets 4,872,369

TORSIONAL VIBRATION DAMPER HAVING A ROLL SPUN HOUSING AND OTHER IMPROVEMENTS

BACKGROUND OF THE INVENTION

This invention relates to improvements in viscous torsional vibration dampers and is more particularly concerned with improving the reliability and lowering the cost of such dampers.

Viscous torsional vibration dampers of the kind to which the present invention is directed have heretofore been successfully produced with cast ferrous, forged ferrous, stamped, and welded housings all machined to provide the desired dimensions, providing an axially opening annular working chamber within which is housed a complementary annular inertia mass ring and with a cover sealed across the axial opening of the housing for confining the inertia ring within the annular working chamber therein. Opposed surfaces of the inertia ring and the housing are in shear film spaced relation having regard to a viscous damping fluid substantially filling those spaces. Cast, forged, and stamped and welded housings require much machining, and therefore present a substantial cost factor in the dampers.

A further proposal has been to finish shape the damper housings by hydroforming techniques. This necessitates rather wide tolerances and therefore unusually high viscosity damping fluid, unless the shear film gap surfaces are machined, consequently resulting in a costly construction. By way of example Pat. No. 3,512,612 is referred to for a disclosure of the hydroforming proposal for such dampers.

SUMMARY OF THE PRESENT INVENTION

An important object of the present invention is to overcome the disadvantages and problems encountered in respect to prior viscous torsional vibration dampers and methods of making the same and to provide a new and improved damper of this type and method of making the same.

Another object of the present invention is to provide a new and improved torsional viscous vibration damper and method of producing the same wherein the damper housing is roll spun, with the advantages resulting from such formation of the damper housing.

Still another object of the present invention is to provide a new and improved damper of the character indicated, resulting in substantial production and structural economies.

A further object of the present invention is to provide in such a damper a new and improved means for mounting the closure to the housing of the damper and for maintaining the integrity of the hermetic seal between the housing and the closure.

In accordance with the principles of the present invention there is provided in a viscous torsional vibration damper of the kind operating on the shear film principle and having an annular channel shaped housing providing an annular working chamber within which is mounted an annular complementary inertia mass ring and a viscous damping fluid substantially filling shear film spaces between working surfaces of the inertia ring and confronting work hardened working surfaces of the housing within the chamber, the housing comprising a roll spun generally channel shaped annular shell having a generally axially facing base wall and spaced axially extending radially inner and radially outer walls joined by annular radius corners and which walls provide the housing working surfaces, an integral annular hub flange extending radially inwardly from the distal edge of the radially inner wall and provided with an annular series of spaced bolt holes, the housing working surfaces having an outwardly facing shoulder seat on the distal edge of the radially outer wall encircled by an offset annular lip flange, a circular closure of an outside diameter complementary to and closely fitting within the offset lip flange and seated on the shoulder seat and having bolt holes matching bolt holes of the hub flange, means hermetically sealing the interfaces of the hub flange and the closure, and means hermetically sealing the radially outer edge of the closure to the lip flange and shoulder seat.

A further aim of the present invention is to provide a new and improved method of making torsional viscous vibration dampers having the new and improved construction aforesaid.

BRIEF DESCRIPTION OF THE DRAWINGS

Other objects, features, and advantages of the present invention will be readily apparent from the following description of a preferred embodiment thereof, taken in conjunction with the accompanying drawings although variations and modifications may be effected without departing from the spirit and scope of the novel concept embodied in the disclosure, and in which.

DETAILED DESCRIPTION

Figure 1:
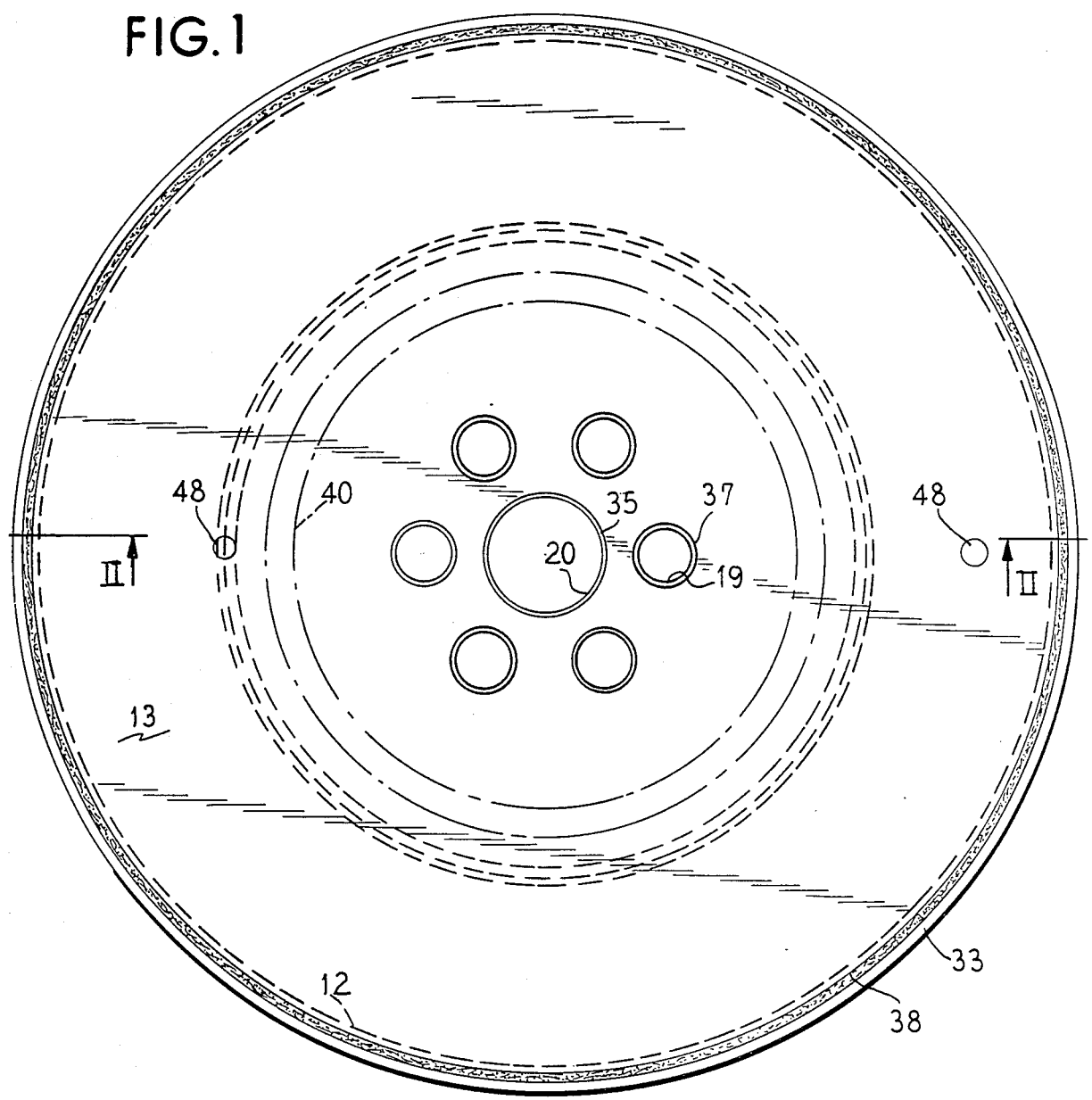
FIG. 1 is a plan view of a viscous torsional vibration damper embodying the present invention.
Figure 2:
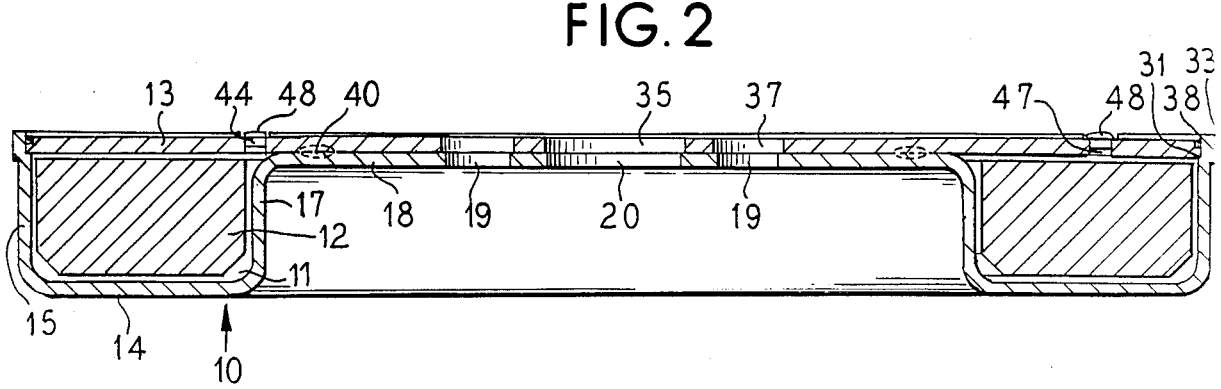
FIG. 2 is a transverse sectional detail view taken substantially along the line II—II in FIG. 1.

A typical viscous torsional vibration damper, sometimes referred to as a crankshaft damper, embodying the present invention, is depicted in FIGS. 1 and 2. This damper comprises as its major components a one piece channel shaped housing 10 defining an annular working chamber 11, within which is housed a complementary inertia member ring 12, and with the axially open side of the housing closed by a closure 13 which is desirably in the form of a stamped or otherwise shaped plate.

Of particular importance is the construction of the housing 10 which is formed from a single piece of suitable gauge sheet metal such as about 0.03% aluminum in aluminum killed steel roll formed to shape to provide the channel shape for the working chamber 11 defined on one axial side by a radially extending base wall 14 which integrally joins a generally axially extending radially outer annular wall 15 and a generally axially extending radially inner wall 17. This inner wall 17, in turn, joins a radially inwardly extending and axially facing annular hub flange 18 which has an annular series of spaced bolt holes 19 to receive the bolts (not shown) by which the damper is attachable to or in association with a rotary member such as a crankshaft to be damped. A central opening 20 may receive a centering hub, or the like on the member to be damped.

Figure 2A:
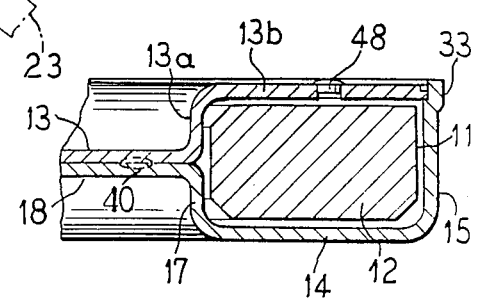
FIG. 2a is a sectional view similar to FIG. 2 but showing a modification.

Although, as shown in full line in FIG. 2, the closure 13 and the hub flange 18 may be located along one axial face of the damper, it may be desirable in some useful applications of the damper to have a different orientation of the hub area of the closure and the hub flange, as exemplified in FIG. 2a.

While, in general the arrangement in FIG. 2a is substantially the same as in FIG. 2, and similar numerals identify the same elements, it will be noted that the wall 17 is shorter than the wall 17 in FIG. 2, and the hub flange 18 is inset relative to the upper edge of the wall 15. The closure disk 13 is correspondingly inset and has an insetting or offsetting flange 13a which joins the central inset portion of the closure disk 13 with an outwardly offset annular portion 13b of the disk that overlies the working chamber 11.

Figure 3:
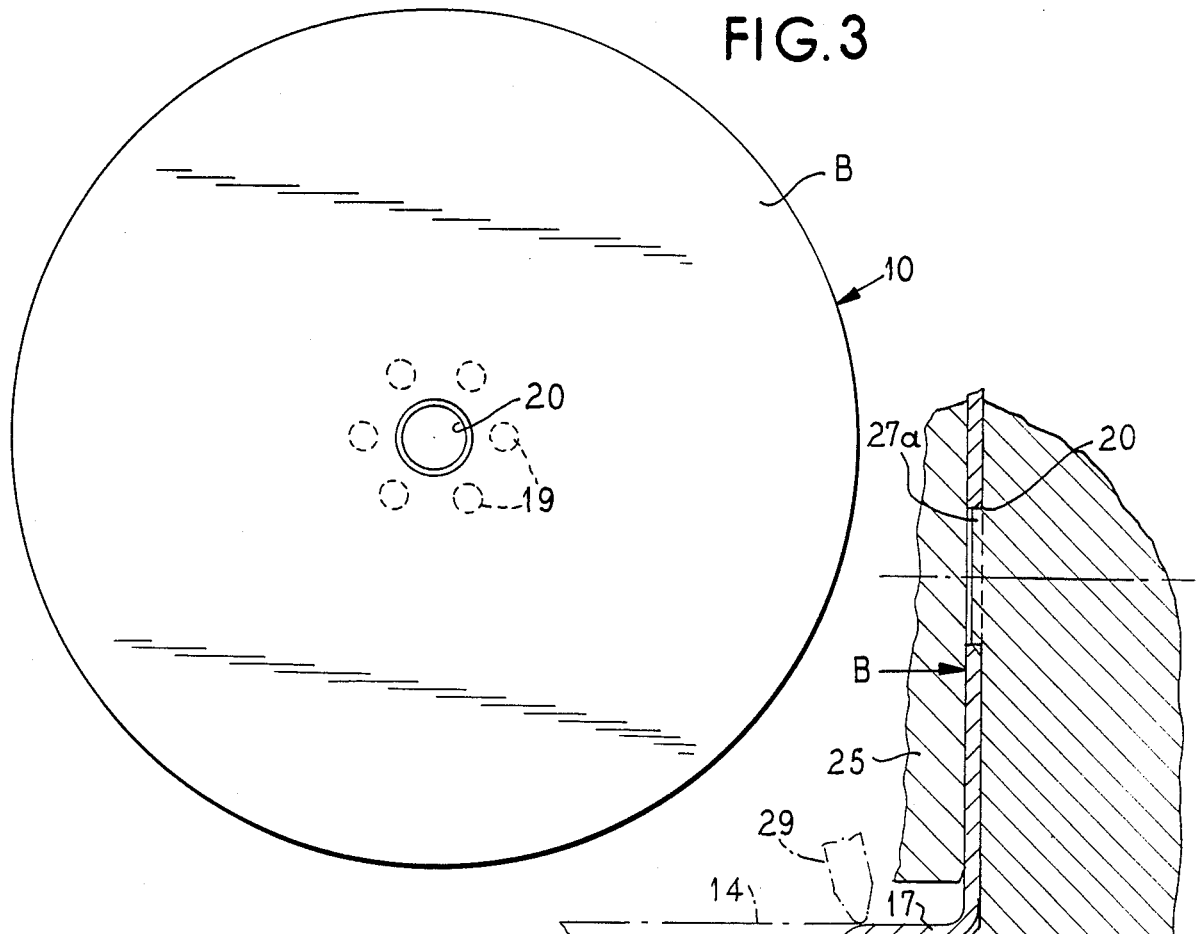
FIG. 3 is a plan view of a blank for fabrication of the damper housing.
Figure 5:
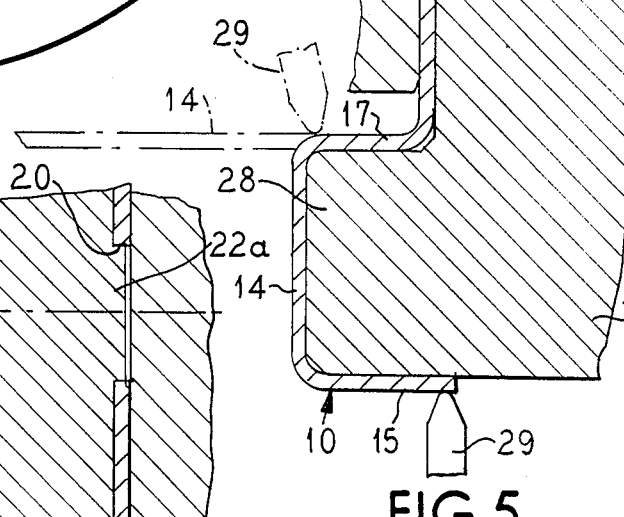
FIG. 5 demonstrates a further step in the roll spinning of the housing.
Figure 4:
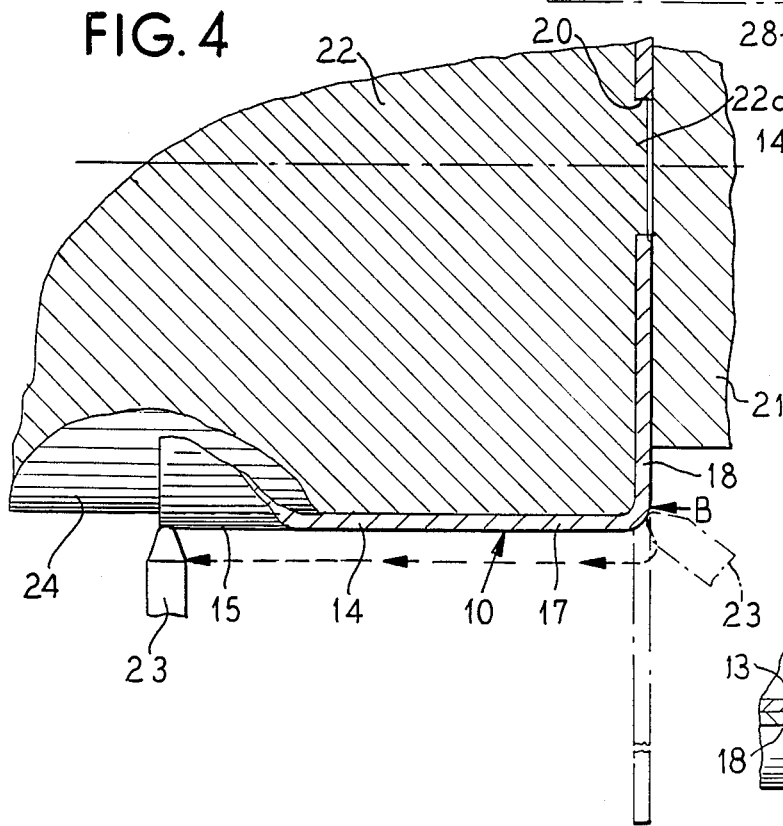
FIG. 4 is a fragmentary sectional elevational view demonstrating a step in the roll spinning of the damper housing.

As demonstrated in FIGS. 3-5, the housing 10 is shaped into a generally channel shaped shell by roll spinning to provide the working chamber channel 11. For this purpose, a circular disk blank B of the preferred material for roll spinning has prepunched therein the center locating opening 20.

For a first phase spinning of the blank B, as shown in FIG. 4, the blank may be attached as by means of a hydraulic clamp 21 to a spinning machine mandrel 22 of the diameter to which the inner wall 17 of the housing is to be formed. A centering boss 22a fits in the center locating opening 20. In the spinning machine an outer diameter portion of the blank B is spun by one or more spinning rollers 23 from the flat orientation shown in dot-dash outline in FIG. 4 to the axial orientation shown in full line along the axially extending cylindrical wall 24 of the mandrel 22. As the spinning roll 23 travels in it spinning function along the outer cylindrical surface of the axially spun portion of the blank B, the surfaces which will become the inner working surfaces of the housing walls 14, 15 and 17 may be work hardened and burnished to a finished surface so that no further machining is needed for those surfaces. In contrast, in prior torsional vibration damper housings the working chamber wall surfaces have had to be machined in a separate operation to avoid abrasion of the customary nylon coating carried by the inertia mass rings when in service the inertia ring 12 may be displaced from the ideal centered damping relation and tend to rub against a working chamber wall surface.

In the next stage of roll spinning of the housing 10 (FIG. 5), the partially spun blank B may be attached as by means of a hydraulic clamp 25 to a spinning mandrel 27 whereon the hub flange portion 18 is clamped to the mandrel 27 from the side opposite to the side that was attached to the mandrel 22. A centering boss 27a engages in the centering opening 20. In addition, the mandrel 27 has an annular forming backup rib 28 of a cross section corresponding to the cross sectional dimension desired for the inside of the working chamber channel 11 of the finished housing 10. After attachment of the blank B by means of the clamp 25, the cylindrical formation 14, 15, 17 is spun by one or more spinning rolls 29 over and onto the shaping or forming rib 28 to attain the final U-shape for the channel 11 of the housing 10. That is, the axially extending formation into which the blank B radially outwardly from the hub area 18 was shaped by the spinning roller means 23 (FIG. 4), is now spun to provide the radially inner wall 17, the axially facing base wall 14 and the radially outwardly facing wall 15 of the housing 10. As the roll spinning by the roller means 29 progresses, an annular radius juncture joining the walls 14 and 17 and an annular radius juncture joining the walls 14 and 15 are roll spun.

Figure 6:
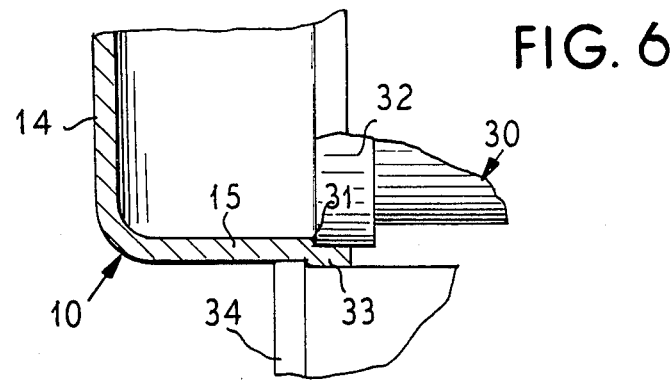
FIG. 6 demonstrates the roll forming of a stepped shoulder for receiving the radially outer edge of the cover of the damper.

Finally, the housing member 10 is subjected to a set of forming rolls 30 (FIG. 6) in order to shape along the distal edge of the housing wall 15, a rabbet providing an annular axially outwardly facing shoulder seat 31 for the axially inner face at the radially outer edge of the closure 13. To this end, a set of forming rolls comprises a roll 32 which is designed to shape an annular radially outwardly offset rim flange 33 at the distal edge of the housing wall 15, in cooperation with a complementary shaping roll 34 which maintains the necessary stepped offset for providing the seat 31 while assuring integrity of the connection between the offset rim flange 33 and the body of the wall 15. As a result, the seat 31 maintains an accurate spacing of the closure 13 from the wall 14.

Figures 7, 7A:
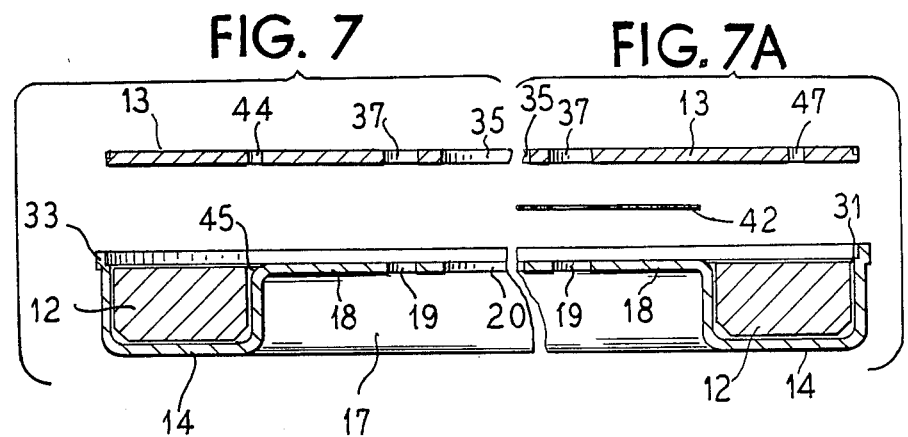
FIGS. 7 and 7A are exploded assembly view of the damper component.

As demonstrated in the exploded illustrative schematic view in FIGS. 7 and 7A, assembly of the damper is effected by initially depositing the inertia mass ring 12 within the working chamber 11. It will be understood that the inertia ring member 12 will have been accurately machined and desirably provided with a bearing surface material such as nylon, as is common practice in this art to avoid seizure of contacting ferrous surfaces in the presence of silicone viscous damping fluid, which is a recognized phenomenon.

After the inertia ring member 12 has been assembled within the housing 10, the closure 13 is mounted in place. Prior to such mounting, the closure 13 is desirably prepunched with a centering hole 35 matching the centering hole 20 of the hub flange 18, and bolt holes 37 matching the bolt holes 19.

Figure 8:
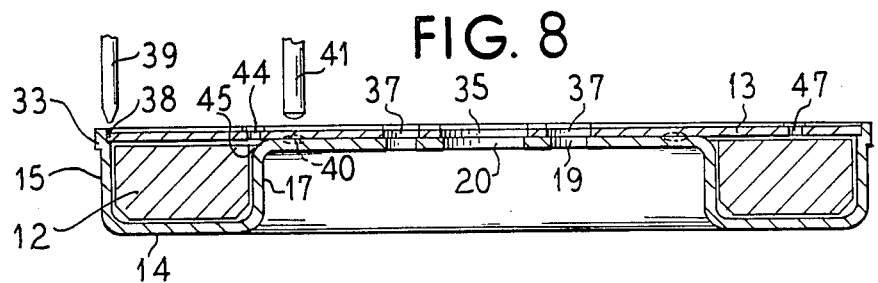
FIG. 8 shows the damper components assembled and schematically illustrates the welding procedures.
Figure 9:
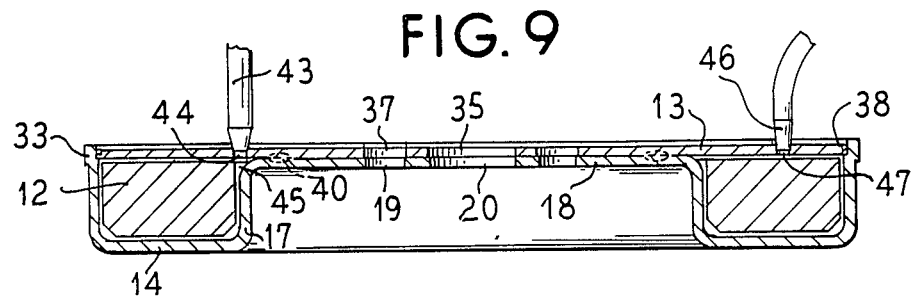
FIG. 9 demonstrates how the damper is filled with viscous damping fluid.

Permanent, hermetically sealed attachment of the closure 13 to the body shell 10 is preferably effected by means of laser welding. To this end, an annular laser weld 38 welds the radially outer edge of the closure 13 to the rim flange 33 adjacent to the seat 31. This may be effected by means of a welding head 39 as demonstrated in FIG. 8. In addition, an annular weld 40 may be effected by means of a laser welding head 41 hermetically sealing the closure 13 to the hub flange 18 adjacent to the wall 17. Such welding may be effected in any desired sequence or simultaneously, as may be preferred.

Alternative attachment of the closure 13 to the housing shell 10 may be by means a bonding agent such as a sealant disk 42 of structural adhesive generally matching the hub flange 18, as shown in FIG. 7A. The adhesive disk 42 may be fuse bonded to and between the closure 13 and the hub flange 18.

Other means for sealingly securing the closure 13 to the hub flange 18 may comprise a sealing ring interposed between these parts, and the closure 13 secured to the hub flange 18 by means such as spot welding.

After the closure 13 has been secured to the housing 10, filling of the chamber 11 with viscous hydraulic damping fluid such as a suitable viscosity silicone may be effected by means of a filling nozzle 43 through a filling hole 44 desirably aligned with reservoir space 45 adjacent to the inner wall 17. For assisting in filling, a vacuum nozzle 46 may be applied to an evacuation hole 47 desirably extending through the closure 13 diametrically opposite to the filling hole 44. After a full load of viscous damping fluid has been filled into the chamber 11, the nozzles 43 and 46 are removed and the holes 44 and 47 suitably sealed as by means of welded plugs 48 (FIGS. 1 and 2).

It will be understood that variations and modifications may be effected without departing from the spirit and scope of the novel concept of this invention.

We claim as our invention:

1. In a viscous torsional vibration damper of the kind operating on the shear film principle and having an annular channel-shaped housing providing an annular working chamber within which is mounted an annular complementary inertia mass ring and a viscous damping fluid substantially filling shear film spaces between working surfaces of the inertia ring and confronting working surfaces of the housing within said chamber:
   said housing comprising a roll spun generally channel shaped annular shell having an axially facing base wall and spaced axially extending radially inner and radially outer walls and which walls provide said housing working surfaces;
   annular radius corners joining said walls;
   an integral annular hub flange extending radially inwardly from the distal edge of said radially inner wall and provided with an annular series of spaced bolt holes;
   said housing working surfaces having a spinning roll work hardened burnished finish;
   an axially outwardly facing shoulder seat on the distal edge of said radially outer wall encircled by an annular lip flange of larger inside diameter than the inside diameter of said radially outer wall;
   a circular closure of an outside diameter complementary to and closely fitting within said lip flange and seated on said shoulder seat, and having bolt holes matching bolt holes of said hub flange;
   means hermetically sealing said closure to said hub flange; and
   means hermetically sealing said radially outer edge of said closure to said lip flange.

2. A viscous torsional vibration damper according to claim 1, wherein said housing comprises about 0.03% aluminum in aluminum killed steel.

3. A damper according to claim 1, wherein said means hermetically sealing the interfaces of said hub flange and said closure comprises annular welding.

4. A damper according to claim 1, wherein said means hermetically sealing said radially outer edge of said closure to said lip flange comprises a continuous annular weld.

5. In a viscous torsional vibration damper of the kind operating on the shear film principle and having an annular channel shaped housing providing an annular working chamber within which is mounted an annular complementary inertia mass ring and a viscous damping fluid substantially filling shear film spaces between working surfaces of the inertia ring and confronting working surfaces of the housing within said chamber;
   said housing comprising a roll spun generally channel shaped annular shell having an axially facing base wall and spaced axially extending radially inner and radially outer walls and which walls provide said housing working surfaces;
   annular radius corners joining said walls; and
   said housing working surfaces having a spinning roll work hardened burnished finish.

6. A damper according to claim 5, wherein one of said axially extending walls has a roll-formed rabbet comprising a seat engaged by an axial face at an edge of a closure, and means hermetically sealing said closure edge in said rabbet.

7. A damper according to claim 6, wherein said closure edge is welded by a circular weld to a lip flange defining said rabbet, and thereby providing said sealing.

8. A damper according to claim 5, wherein said housing has a hub flange connected to said radially inner wall engaged in face-to-face relation by said closure, said hub flange and said closure having annular series of matching spaced bolt holes, and means hermetically sealing said closure to said hub flange adjacent to said bolt holes.

9. In a viscous torsional vibration damper of the kind operating on the shear film principle and having an annular channel shaped housing providing an annular working chamber within which is mounted an annular complementary inertia mass ring and a viscous damping fluid substantially filling shear film spaces between working surfaces of the inertia ring and confronting working surfaces of the housing within said chamber:
   said housing comprising a generally channel shaped annular shell having an axially facing base wall and spaced axially extending radially inner and radially outer walls and which walls provide said housing working surfaces;
   wherein said channel shaped annular shell is a roll spun structure and wherein said housing working surface areas have spinning roll work hardened burnished finish;
   a roll-formed rabbet comprising an axially outwardly facing shoulder seat on the distal edge of one of said axially extending walls;
   a lip flange surrounding said seat in radially offset relation to said one wall; and
   a circular closure closing said chamber and having an edge seated in hermetically sealed relation in said rabbet.

10. A damper according to claim 8, wherein said housing has a hub flange connected to said radially inner wall engaged in face-to-face relation by said closure, and an annually laser weld permanently secures said closure to said hub flange.

11. In a viscous torsional vibration damper of the kind operating on the shear film principle and having an annular channel shaped housing providing an annular working chamber within which is mounted an annular complementary inertia mass ring and a viscous damping fluid substantially filling shear film spaces between working surface of the inertia ring and confronting working surfaces of the housing within said chamber;
   said housing having an annular channel shaped shell with a central hub flange;
   a closure for said housing and with a portion of said closure overlapping said hub flange;
   a circumferential laser weld securing said overlapping portion of the cover plate to said hub flange;
   said housing shell being roll spun and having annular angularly related walls joined by roll spun annular radius corners; and
   a roll spun work hardened burnished finish on critical working surfaces on said walls within said working chamber.

12. A damper according to claim 11, having a roll formed rabbet providing a shoulder seat on a distal edge portion of one of said angularly related walls of said shell, and an edge of said closure secured in said rabbet.

* * * * *